United States Patent
Dang

(10) Patent No.: US 10,259,890 B2
(45) Date of Patent: Apr. 16, 2019

(54) CROSSLINKED POLYMER, HYDROGEL OR WATER-BASED FRACTURING FLUID COMPRISING THE SAME, AND METHODS OF MAKING AND USING THEREOF

(71) Applicant: Yuan Yi, Jiangxi (CN)

(72) Inventor: Xiaojun Dang, Shanghai (CN)

(73) Assignee: Yuan Yi, Jiangxi (CN)

( * ) Notice: Subject to any disclaimer, the term of this patent is extended or adjusted under 35 U.S.C. 154(b) by 0 days.

(21) Appl. No.: 15/544,587

(22) PCT Filed: May 26, 2016

(86) PCT No.: PCT/CN2016/083446
§ 371 (c)(1),
(2) Date: Jul. 19, 2017

(87) PCT Pub. No.: WO2016/188446
PCT Pub. Date: Dec. 1, 2016

(65) Prior Publication Data
US 2018/0273649 A1     Sep. 27, 2018

(30) Foreign Application Priority Data

May 28, 2015   (CN) .......................... 2015 1 0281989

(51) Int. Cl.
C08B 37/00      (2006.01)
C08J 3/24       (2006.01)
(Continued)

(52) U.S. Cl.
CPC ........ C08B 37/0096 (2013.01); C08B 37/009 (2013.01); C08B 37/0087 (2013.01);
(Continued)

(58) Field of Classification Search
None
See application file for complete search history.

(56) References Cited

U.S. PATENT DOCUMENTS 6,419,957 B1 *    7/2002  Lenaerts ............. A61K 9/2059
                                                  424/464
2012/0222793 A1 *  9/2012  McCreight ........... G02B 5/3083
                                                  156/60

FOREIGN PATENT DOCUMENTS

CN    1050573642    11/2015
JP    0782416       3/1995
(Continued)

OTHER PUBLICATIONS

Chen, et al., "Study on preparation of cross-linked carboxymethyl guar gum", Science and Technology of Food Industry, 2011, 10:292-294.
(Continued)

*Primary Examiner* — Jeffrey D Washville
(74) *Attorney, Agent, or Firm* — Cesari and McKenna, LLP

(57) ABSTRACT

The invention provides a crosslinked polymer, a hydrogel, a water-based fracturing fluid comprising the same, and methods of making and using thereof. The crosslinked polymer of the invention is represented by formula (I), wherein * denotes a combining site with a polymer starting material and *' denotes an optional combining site with the polymer starting material, wherein the combining sites denoted by * and *' may be located in the same polymer molecule, or in different polymer molecules, but there are at least two combining sites located in different polymer molecules; $X_1$ and $X_2$, which may be the same or different, are independently an oxy (—O—) or imino (—NH—) group; $X_3$ is an oxy (—O—) or imino (—NH—) group when *' denotes a combining site with the polymer starting material, or $X_3$ is a halogen, $NH_2$ or OH when *' isn't a combining site with the polymer starting material. The crosslinked polymer of the invention can be used in water-based fracturing fluid, in
(Continued)

personal care products, household care products and pet care products, in reusable hydraulic fracturing flowback fluid, in gel explosives or in fire extinguishing mortar.

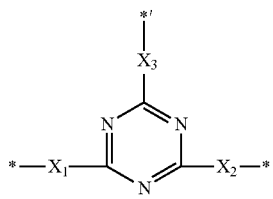

(I)

20 Claims, 1 Drawing Sheet

(51) Int. Cl.
*C08F 116/06* (2006.01)
*C08F 120/56* (2006.01)
*C09K 8/68* (2006.01)
*C09K 8/88* (2006.01)
*C09K 8/90* (2006.01)

(52) U.S. Cl.
CPC .......... *C08F 116/06* (2013.01); *C08F 120/56* (2013.01); *C08J 3/24* (2013.01); *C09K 8/685* (2013.01); *C09K 8/887* (2013.01); *C09K 8/90* (2013.01); *C08F 2810/20* (2013.01); *C08J 2305/00* (2013.01); *C08J 2329/04* (2013.01); *C08J 2333/26* (2013.01)

(56) References Cited

FOREIGN PATENT DOCUMENTS

| TW | 201223963 | 6/2012 |
| WO | WO 99/43305 | 9/1999 |
| WO | WO 2010/046688 | 4/2010 |
| WO | WO 2014/107491 | 7/2014 |
| WO | WO 2015/133439 | 9/2015 |

OTHER PUBLICATIONS

Tang, et al., "Preparation of Cross-linked Guar Gum", Food Science, 2012, vol. 33, No. 16 pp. 72-76.

* cited by examiner

CROSSLINKED POLYMER, HYDROGEL OR WATER-BASED FRACTURING FLUID COMPRISING THE SAME, AND METHODS OF MAKING AND USING THEREOF

CROSS REFERENCE TO RELATED APPLICATIONS

This application is the National Stage of International Application No. PCT/CN2016/083446, filed on May 26, 2016, which claims the benefit of Chinese Application No. 201510281989.2, filed on May 28, 2015. The contents of both applications are hereby incorporated by reference in their entirety.

FIELD OF THE INVENTION

The present invention relates to a novel polymer thickener, in particular a crosslinked polymer, and its preparation, as well as its use in fields such as hydraulic fracturing.

BACKGROUND OF THE INVENTION

The fracturing technologies and fracturing fluids have experienced more than 60 years' development since the United States carried out the first work of fracturing stimulating production in 1947. The water-based fracturing fluids have occupied a dominant position because this technology develops fastest and the system has comprehensive advantages. Among the water-based fracturing fluids, the guar system occupies 70-90% of market share because of its performance advantages. Fracturing has been rapidly developed and widely applied as the major method for increasing production and increasing injection of the oil and gas reservoir. The fracturing fluid is one of the important parts of the fracturing technologies. At present, the common fracturing fluids are major polymer hydrogel fracturing fluids crosslinked by boron, zirconium, titanium, etc. These fracturing fluids mainly use their viscose properties to carry sand. Consequently the fracturing fluids have high initial viscosity, high thickener concentration, large construction friction resistance and poor temperature-resistance performance, poor sand-carrying performance at high temperature. The sand-carrying property needs further improvement. At the same time, the used crosslinking agent will finally return to the ground together with flowback fluid in the form of ions containing the crosslinking agent. And therefore, the used crosslinking agent requires post-treatment.

90% of global guar gum is from India and Pakistan. It has high risk on supply security. The guar gum was up to 180,000 Yuan per ton in 2012. The high price of guar gum not only increases the fracturing cost of the oil reservoir, but also causes huge pressure for normal fracturing production.

Some scholars have tried to use epichlorohydrin as the crosslinking agent to prepare the crosslinked guar gum or derivatives thereof. The relatively high degree of crosslinking is achieved, but the solubility of the prepared crosslinked guar gum is not high in water, and thus is not suitable in field of fracturing fluids (Tang Hongbo, Wang Xiguang, Li Yanping, Preparation of cross-linked guar gum, Food science, 2012, Vol. 33, No. 16: 72-76; Chen Nali, Feng Huixia, Zhao Xia, et al, Study on preparation of crosslinked carboxymethyl guar gum, Science and technology of food industry, 2011, 10: 292-294).

Hydraulic fracturing technology needs to consume large amount of water resource. In districts where the supply demand is high relative to the available water resource, the water extraction made by the well drilling and hydraulic fracturing operations may cause increasingly serious problems of water resource depletion and environmental degradation. These operations, including the fracturing work on the offshore working platform, need to deliver fresh water to the working platform. Therefore, whether in the view of operation cost or in the view of environmental protection, the recycling use technology of fracturing flowback fluid has become the trend of the fracturing technology for using water resource effectively and reasonably.

SUMMARY OF THE INVENTION

The object of the invention is to provide a crosslinked polymer and its preparation process, a hydrogel and a water-based fracturing fluid comprising the crosslinked polymer, and the use of the crosslinked polymer or the hydrogel.

In one aspect of the invention, provided is a crosslinked polymer having a crosslinked skeletal structure represented by the following formula (I):

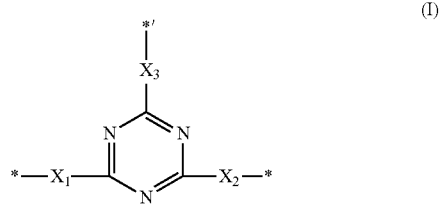

wherein, * denotes a combining site with a polymer starting material, *' denotes an optional combining site with the polymer starting material; where, the combining sites denoted by * and *' may be located in the same polymer molecule, or in different polymer molecules, but there are at least two combing sites located in different polymer molecules; $X_1$ and $X_2$, which may be the same or different, are independently an oxy (—O—) or imino (—NH—) group; $X_3$ is an oxy (—O—) or imino (—NH—) group when *' denotes a combining site with the polymer starting material, or $X_3$ is a halogen, $NH_2$ or OH when *' isn't a combining site with the polymer starting material.

The crosslinked polymer of the invention is preferably obtained through the reaction between —OH and/or —$NH_2$ groups of the polymer starting material and 2,4,6-trihalogen-1,3,5-triazine.

In another aspect of the invention, a hydrogel formed from the above crosslinked polymer in an aqueous medium, or formed from a polymer starting material co-crosslinked by 2,4,6-trihalogen-1,3,5-triazine and at least one of boron, zirconium and titanium in an aqueous medium, is provided.

In another aspect of the invention, a process for preparing the above crosslinked polymer is provided, wherein the method comprises the reaction between 2,4,6-trihalogen-1,3,5-triazine and the polymer starting material, optionally in the presence of a pH regulator.

In another aspect of the invention, a water-based fracturing fluid used for hydraulic fracturing fluid is provided, wherein the water-based fracturing fluid comprises:

(1) the above hydrogel; and (2) at least one of surfactant, clay stabilizer, bactericide, gel breaker, pH regulator, filtrate reducer, drag reducer, diverter, foamer, temperature stabilizer, iron ion stabilizer, and mineral salt.

In another aspect of the invention, the use of the above crosslinked polymer or the above hydrogel in water-based fracturing fluid, in personal care products, household care products and pet care products, in recycling use of hydraulic fracturing flowback fluid, in gel explosives or in fire extinguishing mortar is provided.

The crosslinked polymer of the invention is a novel crosslinking polymer thickener. It can form a hydrogel with high stability and high sand-carrying performance. Therefore, it can be widely used in various fields, such as water-based fracturing fluid, gel explosives, fire extinguishing mortar, personal care products, house care products and pet care products.

DETAILED DESCRIPTION

Figure 1:
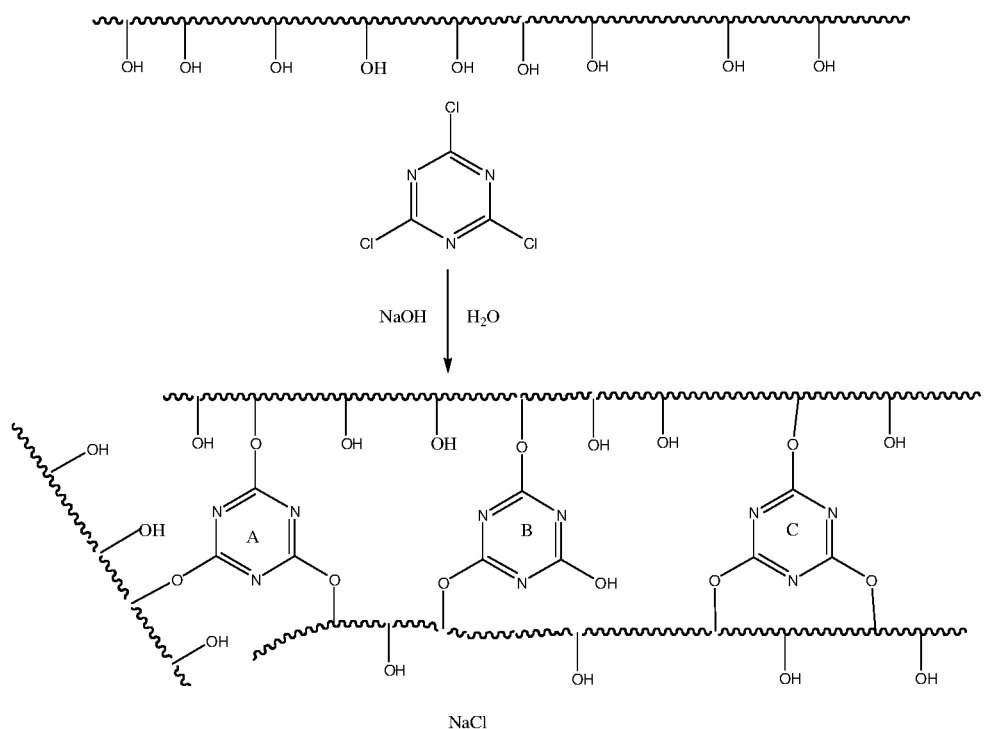
FIG. 1 schematically shows the crosslinking reaction of polymer with 2,4,6-trichloro-1,3,5-triazine.

The inventors conduct systematic studies on the basis of the current status and development trend of water-based fracturing fluid, and finally find a novel aqueous crosslinked polymer thickener and its preparation process. In the invention, extensive water resources such as distilled water, tap water, river water, sea water, rain water, underground water, formation produced water, and the fracturing flowback fluid; extensive water-soluble polymers can be used; and the sand suspension performance of fracturing fluids of fenugreek gum and the like can be increased to a level exceed that of boron-guar gum or zirconium-guar gum system. The invention is applicable for guar gum and derivatives thereof, konjac gum and derivatives thereof, fenugreek gum and derivatives thereof, polyvinyl alcohol and derivatives thereof, xanthan gum and derivatives thereof, etc. It can all greatly improve the performance of the fracturing fluids. Especially, the sand-carrying performance at high temperature is dramatically improved. The fracturing flowback fluid of the invention can be directly recycled by simple filtration treatment or taking supernatant after spontaneous sedimentation, while in the case of the boron-guar gum and/or zirconium-guar gum system, the fracturing flowback fluid could not be recycled without the filtration and more importantly, the necessary treatment for removing boron and/or the zirconium. Furthermore, the crosslinked polymer or the hydrogel of the invention can be also used in gel explosives, fire extinguishing mortar, personal care products, house care products and pet care products.

The followings are the detailed descriptions of the specific embodiments of the invention.

In one embodiment of the invention, provided is a crosslinked polymer having a crosslinked skeletal structure represented by the following formula:

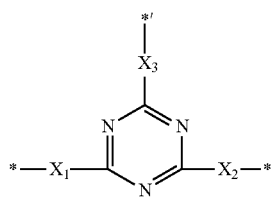

wherein, * denotes a combining site with a polymer starting material, and *' denotes an optional combining site with the polymer starting material; wherein the combining sites denoted by * and *' may be located in the same polymer molecule, or in different polymer molecules, but there are at least two combining sites located in different polymer molecules; $X_1$ and $X_2$, which may be the same or different, are independently an oxy (—O—) or imino (—NH—) group; $X_3$ is an oxy (—O—) or imino (—NH—) group when *' denotes a combining site with the polymer starting material, or $X_3$ is a halogen, $NH_2$ or OH when *' isn't a combining site with the polymer starting material.

The crosslinked polymer of the invention is preferably obtained through the reaction between the polymer starting material containing —OH and/or —$NH_2$ groups and 2,4,6-trihalogen-1,3,5-triazine. The —OH and —$NH_2$ groups contained in the polymer can react with 2,4,6-trihalogen-1,3,5-triazine to form the crosslinked structure. Preferably, the polymer starting material has more than one group, which can react with 2,4,6-trihalogen-1,3,5-triazine, in one molecule.

The halogens contained in 2,4,6-trihalogen-1,3,5-triazine of the invention comprise fluorine, chlorine, bromine, iodine. And the three halogen atoms can be the same or different halogen atoms. The preferred 2,4,6-trihalogen-1,3,5-triazine of the invention is cyanuric chloride.

The polymer starting materials of the invention comprise at least one of galactomannan, galactomannan derivatives, konjac gum, konjac gum derivatives, starch, starch derivatives, cellulose, cellulose derivatives, chitin, chitin derivatives, chitosan, chitosan derivatives, xylan, xylan derivatives, glucan, glucan derivatives, xanthan gum, xanthan gum derivatives, sodium alginate, sodium alginate derivatives, polyvinyl alcohol, polyvinyl alcohol derivatives, polyacrylamide, polyacrylamide derivatives. Here, the derivatives comprise the ethers, the esters etc., derived from the polymer. For example, hydroxylpropyl guar gum, hydroxylmethyl guar gum, hydroxylpropyl methyl cellulose, etc.

The galactomannans of the invention comprise at least one of the seed gum of guar, fenugreek, *sesbania, sesbania aculeata, robinia pseudoacacia, sophora japonica, indigofera pseudotinctoria, crotalaria mucronata, c. spectabilis, zenia insignis, gleditisia macracantha, gymnocladus chinensis, g. melanacantha, gleditisia heterophylla, g. japonica, gleditsia japonica* miq., *erythrophleum fordii, delonix regia, c. tora, c. noname, cassia sophera, c. occidentalis, ceratonia siliqua, cassia javanica* l. var. *indo-chinensis gagnep, cassia javanica* var. *indo-dainensis, cassia fistula, bauhinia veriegata* var. *candida, leicaena glauca, adenanthera pavonina, artemisia desertorum*, and *caesalpinia spinosa*.

In the crosslinked polymer of the invention, two or more polymer molecules are crosslinked through the reaction between the halogen atoms of 2,4,6-trihalogen-1,3,5-triazine and the —OH and/or the —$NH_2$ of the polymer, so as to form a spatial network structure. Because the polymer molecule has more than one crosslinkable group, a relatively complex spatial network structure is formed by the crosslinked polymer molecules.

The crosslinking reaction of polymer with 2,4,6-trihalogen-1,3,5-triazine in the invention is shown in FIG. 1, taking cyanuric chloride as an example.

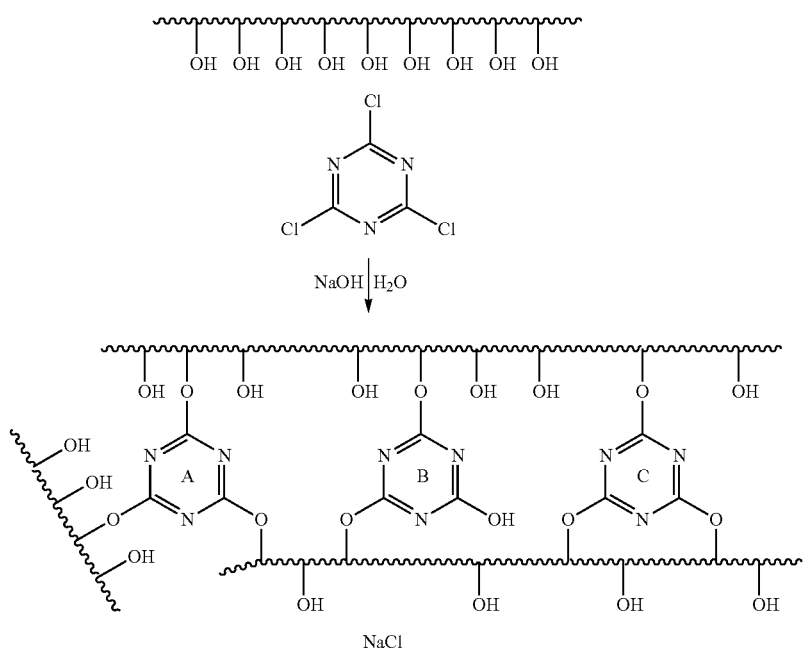

In FIG. 1, A, B, C rings denote several typical crosslinking manners.

A: cyanuric chloride bonded with three polymer molecules

B: cyanuric chloride bonded with two polymer molecules and the remaining chlorine atom being converted to —OH by hydrolysis.

C: cyanuric chloride having two combining sites bonded with the same polymer molecule and one combining site bonded with another polymer molecule.

In above reactions, the reactive group is only exemplified by —OH. Such reactive group can also be a primary amine, a secondary amine, etc.

In another embodiment of the invention, a hydrogel formed from the above crosslinked polymer in an aqueous medium is provided.

The aqueous medium comprises various kinds of water resources, such as distilled water, tap water, river water, sea water, rain water, underground water, formation produced water, and the fracturing flowback fluid. The aqueous medium may also be a mineral water (for example, 20,000 mg/L mineral water obtained by dissolving 1.73 g calcium chloride, 1.17 g magnesium chloride, 5.27 g sodium sulfate and 11.83 g sodium chloride with distilled water in a total volume of 1 liter).

The hydrogel of the invention may also be a co-crosslinked polymer hydrogel, obtained by using both 2,4,6-trihalogen-1,3,5-triazine and at least one of boron, zirconium and titanium as the crosslinker. Therefore, the invention also provides a hydrogel system, which comprise a polymer hydrogel crosslinked by 2,4,6-trihalogen-1,3,5-triazine and optionally, a polymer hydrogel crosslinked by boron, zirconium or titanium, and/or a polymer hydrogel co-crosslinked by 2,4,6-trihalogen-1,3,5-triazine and at least one of boron, zirconium and titanium.

The hydrogel of the invention has high stability and high sand-carrying performance, even under the conditions of high temperature and high pressure (e.g., at a temperature up to 180° C. in a subterranean formation) and under high shearing condition of e.g. 170 s$^{-1}$.

In another embodiment of the invention, a method for preparing the above crosslinked polymer is provided. The method comprises reacting 2,4,6-trihalogen-1,3,5-triazine with the polymer starting material, optionally in the presence of a pH regulator.

The pH regulator comprises metal oxide, metal hydroxide, metal salt and organic amine, etc. For examples, one or more of magnesium oxide, calcium oxide, sodium hydroxide, potassium hydroxide, calcium hydroxide, sodium carbonate, potassium carbonate, calcium carbonate, sodium bicarbonate, potassium bicarbonate, calcium bicarbonate, sodium phosphate, disodium hydrogen phosphate, sodium dihydrogen phosphate, potassium phosphate, dipotassium hydrogen phosphate, potassium dihydrogen phosphate, calcium phosphate, calcium hydrogen phosphate, calcium dihydrogen phosphate, ethylenediamine, triethylamine, tributylamine can be used.

In the method of the invention, the weight ratio of 2,4,6-trihalogen-1,3,5-triazine to the polymer starting material is 1:(0.001-1000), preferably 1:(0.01-100), more preferably 1:(0.1-10), and most preferably 1:(1-6). The molar ratio of 2,4,6-trihalogen-1,3,5-triazine to the pH regulator is 1:(0-100), preferably 1:(0.1-10), more preferably 1:(0.5-5), and most preferably 1:(2-3).

The polymer starting material can be swollen in the aqueous medium to form a solution before reaction.

In particular, the preparation method of the crosslinked polymer in the invention comprises the steps of
  (1) mixing the polymer starting material with the aqueous medium to form a homogeneous solution; and
  (2) adding 2,4,6-trihalogen-1,3,5-triazine and optionally a pH regulator into the solution, and carrying out a sufficient reaction, thereby obtaining the crosslinked polymer.

To satisfy the comprehensive performance requirement of the fracturing fluid, at least one of surfactant, clay stabilizer, bactericide, gel breaker, pH regulator, filtrate reducer, drag reducer, diverter, foamer, temperature stabilizer, iron ion stabilizer, mineral salt can be added when preparing the polymer solution.

The temperature of the polymer solution may be 0-100° C. And the preferred one is the ambient temperature. For example, the temperature may be 0° C., 1° C., 2° C., 5° C., 10° C., 20° C., 50° C., 100° C., and any temperature between two temperatures above.

In addition, before reaction, the 2,4,6-trihalogen-1,3,5-triazine may be added into the polymer solution after being formulated into a solution, or the 2,4,6-three halogenated triazine may be directly added into the polymer solution.

As the solvent to be used for preparing the 2,4,6-trihalogen-1,3,5-triazine solution, water, or water and at least one of organic solvent can be used. The organic solvent includes alcohol, ether, ketone, amide, sulphone, ester, etc. For example, methanol, ethanol, isopropanol, n-propanol, ethylene glycol, dioxane, tetrahydrofuran, N,N'-dimethylformamide, N,N'-dimethylacetamide, N-methyl pyrolidone, acetone, butanone, cyclohexanone, methyl amyl ketone, dimethyl sulfoxide, ethylene glycol dimethyl ether, ethylene glycol diethyl ether, ethylene glycol methyl ethyl ether, ethyl acetate, methyl acetate, methyl formate, ethyl formate, acetonitrile, and nitromethane.

On the other hand, a surfactant can be used to improve the solubility and dispersion of 2,4,6-trihalogen-1,3,5-triazine when preparing the solution.

In another embodiment of the invention, a water-based fracturing fluid for hydraulic fracturing is provided. The water-based fracturing fluid comprises: (1) the hydrogel of the invention; and (2) at least one of surfactant, clay stabilizer, bactericide, gel breaker, pH regulator, filtrate reducer, drag reducer, diverter, foamer, temperature stabilizer, iron ion stabilizer, and mineral salt.

To get a complete system for fracturing, (3) proppant may be added into the above water-based fracturing fluid. The proppant may be at least one of quartz sand, coated quartz sand, ceramic aggregate, coated ceramic aggregate, glass ball, coated glass ball, mineral powder, coated mineral powder, nutshell powder, coated nutshell powder, composite powder, coated composite powder.

The water-based fracturing fluid of the invention uses the crosslinked polymer as the thickener. By means of covalent bonds formed by the reaction between 2,4,6-trihalogen-1,3,5-triazine and —OH and/or —NH$_2$ groups, the polymer molecules crosslink with each other and form a spatial network structure, such that friction resistance, sand-carrying performance and temperature resistance are obviously better than those of boron-, zirconium- or titanium-crosslinked polymer. Among fracturing fluids having the same concentration of thickener, the hydrogel of the crosslinked polymer of the invention has lower viscosity, smaller friction resistance and better sand-carrying performance. The sand-carrying performance at high temperature is particularly excellent, almost the same as that at ambient temperature. Therefore, among the fracturing fluids with the same requirement of the sand-carrying performance, the hydrogel of the crosslinked polymer of the invention has a lower dosage of thickener and correspondingly, has a much lower fracturing cost.

After simple filtration treatment or spontaneous sedimentation, the as-received supernatant of the fracturing flowback fluid of the invention can be directly recycled and used (independently or mixed with another water resource) as the polymer solvent. In contrast, in the case of the conventional boron- and/or zirconium-crosslinked system, the flowback fluid not only needs to be filtrated but more importantly needs the removing treatment of boron and/or zirconium before recycling use.

The fracturing fluid system of the invention has no interference of boron and/or zirconium after gel breaking using persulfate. The supernatant of the flowback fluid after simple filtration or sedimentation can be used to prepare new fracturing fluid after makeup of flesh water required for fracturing, consequently, good effects of saving water resources and protecting environment are achieved.

In another embodiment of the invention, the use of the crosslinked polymer or the hydrogel in water-based fracturing fluid, gel explosive, in personal care products, house care products and pet care products, in recycling use of hydraulic fracturing flowback fluid or in fire extinguishing mortar is provided.

The method of using the crosslinked polymer in water-based fracturing fluid may comprise:

(1) preparing a water-based fracturing fluid comprising the crosslinked polymer of the invention; and (2) pumping the water-based fracturing fluid into the subterranean formation through a well hole.

The method of recycling use of the hydraulic fracturing flowback fluid may comprise:

(1) delivering the liquids after the fracturing of the water-based fracturing liquids containing the crosslinked polymer of the invention back to the ground by pumping to form the flowback fluid;

(2) re-using the flowback fluid, alone or mixed with another water resource, as a polymer solvent.

Optionally, the method further comprises, before step (2), a step of taking supernatant after the flowback liquid is treated with filtration or sedimentation.

The crosslinked polymer or hydrogel of the invention can be used in personal care products, house care products and pet care products, including but not limiting to: shampoo, bath wash, soap, skin cream, cream, air conditioner, shaving products, cleaning cream, neutralizing shampoo, personal care wiper, other hair care products and skin care products.

The crosslinked polymer or hydrogel of the invention can be used in preparation of gel explosive according to the method disclosed in U.S. Pat. No. 3,301,723.

EXAMPLES

Raw Material Information:

Guar gum, BHV-250, manufactured by Natural Polymer Industries (Pvt) Ltd.

Hydroxylpropyl guar gum, JK-101, manufactured by Jingkun Chemistry Company, Kunshan, China.

Carboxy-methyl hydroxyl propyl guar gum, technical grade, manufactured by Jingkun Chemistry Company, Kunshan, China.

Fenugreek gum, technical grade, manufactured by Yangling Shanghe Plant Technology Industry Co., Ltd., China.

*Sesbania* gum, technical grade, manufactured by Lankao county vegetable gum factory, China.

Konjak gum, technical grade, manufactured by Zhengzhou Hongyitai chemical product Co., Ltd., China.

Polyvinyl alcohol, PVA 2688, manufactured by Sinopec Sichuan Vinylon Works, China.

Polyacrylamide, ASP-1X, manufactured by APAMA Wellchem solutions, LLC, Beijing, China.

High density Proppant, GG20/40, apparent density 3.4 g/cm$^3$, manufactured by Yixing Orient Petroleum Proppant Co., Ltd., China.

Evaluation of Properties

According to the "SY/T 5107-2005 Recommended practices on measuring the properties of water-based fracturing fluid" in 2005 and the "SY/T 5185-2008 Evaluation methods of water-based carrying fluid for gravel packing sand control" in 2008, the properties of the crosslinked polymer of the invention were evaluated. Without special instruction, the sand-carrying ratios of the sand suspension examples were all 40% (the used sand was high density proppant, GG20/40, apparent density 3.4 g/cm$^3$, manufactured by Yixing Orient Petroleum Proppant Co., Ltd., China).

Example 1

0.18 g of guar gum was fully dissolved into 100 g of distilled water, at a controlled temperature of 23° C. Then 2 g of 6% cyanuric chloride solution was added into the guar gum solution. The solutions were stirred together and mixed thoroughly. Then 4 g of 2% sodium hydroxide aqueous solution was added and stirring was continued to make the reaction fully performed, leading to the formation of the crosslinked fracturing fluid.

0.18 g of guar gum was fully dissolved into 100 g of distilled water, at a controlled temperature of 23° C. Then 10 g of 0.5% borax (sodium tetraborate decahydrate) aqueous solution was added into the guar gum solution. And stirring was continued to make the reaction fully performed, leading to the formation of the crosslinked fracturing fluid

|  | Viscosity @23° C. | Viscosity @100° C. | Sand-suspension time @23° C. | Sand-suspension time @100° C. |
|---|---|---|---|---|
| Cyanuric chloride crosslinked guar gum | 220 mPa · s | 120 mPa · s | more than 30 d | more than 4 h |
| Borax-crosslinked guar gum | 330 mPa · s | 80 mPa · s | 15 min | no sand carrying capacity |

Example 2

0.3 g of hydroxylpropyl guar gum (HPG) was fully dissolved into 100 g of tap water, at a controlled temperature of 23° C. Then 0.8 g of 6% cyanuric chloride solution was added into the HPG solution. The solutions were stirred together and mixed thoroughly. Then 1.6 g of 2% sodium hydroxide aqueous solution was added and stirring was continued to make the reaction fully performed, leading to the formation of the crosslinked fracturing fluid.

|  | Viscosity @23° C. | Viscosity @100° C. | Sand suspension time @23° C. | Sand suspension @100° C. |
|---|---|---|---|---|
| Cyanuric chloride crosslinked HPG | 450 mPa · s | 230 mPa · s | more than 30 d | more than 4 h |

Example 3

0.25 g of hydroxylpropyl guar gum (HPG) was fully dissolved into 100 g of sea water. Then 0.3 g of 5% surfactant FC-117 aqueous solution (fluorocarbon surfactant, manufactured by Shanghai Jianhong Industrial Co., Ltd.), 1 g of KCl as a clay stabilizer, 1 g of 5% formaldehyde aqueous solution as a bactericide, and 1 g of 8% ammonium persulfate aqueous solution as a gel-breaking agent were added. The solutions were thoroughly mixed at a controlled temperature of 23° C. Then 1 g of 6% cyanuric chloride solution was added into HPG solution. The solutions were stirred together and mixed thoroughly. Then 2 g of 2% sodium hydroxide aqueous solution was added and stirring was continued to make the reaction fully performed, leading to the formation of the crosslinked fracturing fluid.

0.25 g of hydroxylpropyl guar gum (HPG) was fully dissolved into 100 g of sea water. Then 0.3 g of 5% surfactant FC-117 aqueous solution, 1 g of KCl as a clay stabilizer, 1 g of 5% formaldehyde aqueous solution as a bactericide, 1 g of 8% ammonium persulfate aqueous solution as a gel-breaking agent were added. The solutions were thoroughly mixed at a controlled temperature of 23° C. Then 10 g of 0.5% borax (sodium tetraborate decahydrate) was added and stirring was continued to make the reaction fully performed, leading to the formation of the crosslinked fracturing fluid.

|  | Viscosity @23° C. | Viscosity @100° C. | Sand suspension time @23° C. | Sand suspension @100° C. |
|---|---|---|---|---|
| Cyanuric chloride-crosslinked HPG | 260 mPa · s | 135 mPa · s | more than 30 d | more than 4 h |
| Borax-crosslinked HPG | 450 mPa · s | 95 mPa · s | 25 min | no sand carrying capacity |

Example 4

0.3 g of fenugreek gum was fully dissolved into 100 g of rain water, at a controlled temperature of 23° C. Then 0.6 g of 10% cyanuric chloride solution was added into the fenugreek gum solution. The solutions were stirred together and mixed thoroughly. Then 2 g of 2% sodium hydroxide aqueous solution was added and stirring was continued to make the reaction fully performed, leading to the formation of the crosslinked fracturing fluid.

|  | Viscosity @23° C. | Viscosity @100° C. | Sand suspension time @23° C. | Sand suspension @100° C. |
|---|---|---|---|---|
| Cyanuric chloride-crosslinked fenugreek gum | 150 mPa · s | 60 mPa · s | more than 30 d | more than 4 h |

Example 5

1.8 g of polyvinyl alcohol (PVA) was fully dissolved into 100 g of underground water, at a controlled temperature of 23° C. Then 10 g of 6% cyanuric chloride solution was added into the PVA solution. The solutions were stirred together and mixed thoroughly. Then 2 g of 20% sodium hydroxide aqueous solution was added and stirring was continued to make the reaction fully performed, leading to the formation of the crosslinked fracturing fluid.

|  | Viscosity @23° C. | Viscosity @100° C. | Sand suspension time @23° C. | Sand suspension @100° C. |
| --- | --- | --- | --- | --- |
| Cyanuric chloride-crosslinked PVA | 540 mPa·s | 100 mPa·s | more than 30 d | more than 4 h |

Example 6

0.3 g of polyacylamide (PAM, ASP-1X, manufactured by APAMA Wellchem solutions, LLC, Beijing, China) was fully dissolved into 100 g of formation produced water, at a controlled temperature of 23° C. Then 10 g of 6% cyanuric chloride solution was added into the PAM solution. The solutions were stirred together and mixed thoroughly. Then 20 g of 2% sodium hydroxide aqueous solution was added and stirring was continued to make the reaction fully performed, leading to the formation of the crosslinked fracturing fluid.

|  | Viscosity @23° C. | Viscosity @100° C. | Sand suspension time @23° C. | Sand suspension @100° C. |
| --- | --- | --- | --- | --- |
| Cyanuric chloride-crosslinked PAM | 300 mPa·s | 100 mPa·s | more than 120 min | more than 60 min |

Example 7

0.3 g of konjak gum (KGM) was fully dissolved into 100 g of water, at a controlled temperature of 23° C. Then 10 g of 6% cyanuric chloride solution was added into the KGM solution. The solutions were stirred together and mixed thoroughly. Then 20 g of 2% sodium hydroxide aqueous solution was added and stirring was continued to make the reaction fully performed, leading to the formation of the crosslinked fracturing fluid.

|  | Viscosity @23° C. | Viscosity @100° C. | Sand suspension time @23° C. | Sand suspen sion @100° C. |
| --- | --- | --- | --- | --- |
| Cyanuric chloride-crosslinked KGM | 520 mPa·s | 260 mPa·s | more than 30 d | more than 4 h |

Example 8

0.3 g of hydroxylpropyl guar gum (HPG) was fully dissolved into 100 g of gel-breaking flowback fluid of example 2, at a controlled temperature of 23° C. Then 1 g of 10% cyanuric chloride solution was added into the HPG solution. The solutions were stirred together and mixed thoroughly. Then 4 g of 2% sodium hydroxide aqueous solution was added and stirring was continued to make the reaction fully performed, leading to the formation of the crosslinked fracturing fluid.

|  | Viscosity @23° C. | Viscosity @100° C. | Sand suspension time @23° C. | Sand suspension @100° C. |
| --- | --- | --- | --- | --- |
| Cyanuric chloride-crosslinked HPG | 350 mPa·s | 50 mPa·s | more than 24 h | 85 min |

Example 9

0.18 g of guar gum was fully dissolved into 100 g of deionized water, at a controlled temperature of 23° C. Then 2 g of 6% cyanuric chloride solution was added into the guar gum solution. The solutions were stirred together and mixed thoroughly. Then 4 g of 2% sodium hydroxide aqueous solution was added and stirring was continued to make the reaction fully performed, leading to the formation of the crosslinked fracturing fluid. And then 100 g of ethanol was added and stirring was carried out. The formed flocculent precipitate was washed by 50% ethanol aqueous solution and filtrated 3 times. Then the sample was dried overnight in oven at 50° C. Then the element analysis was performed.

As a result of the element analysis, the repeating unit of the cyanuric chloride-crosslinked guar gum was obtained as $(NC)_3C_{69.6}H_{145}O_{71.3}Cl_{0.475}$ having the following crosslinked skeletal structure:

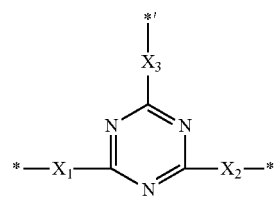

with * denoting a combining site with the polymer, *' denoting an optional combining site with the polymer; $X_1$ and $X_2$ being independently an oxy (—O—) group; $X_3$ being an oxygen or chlorine atom; $(NC)_3$ being the crosslinked bridge structure, that is the residue of the cyanuric chloride.

The unit of the cyanuric chloride-crosslinked galactomannan had 0.475 chlorines, indicating that in each cyanuric chloride molecule, there were 2.525 chlorines carried out the crosslinking reaction with the guar gum hydroxyl groups (assuming that all water in the gel containing NaCl was washed out), and in each unit of guar gum galactomannan, there were 0.653 hydroxyl groups carried out the crosslinking reaction, with a hydroxyl crosslinking density of 7.26% in view of the fact that the unit of guar gum galactomannan is $C_{18}H_{30}O_{15}$ having nine hydroxyl groups.

Example 10

Carrier fluid (solution of hydroxylpropyl guar gum JK-101) was pumped into a blender and blended with proppant and 20% TCT. The stream was combined with a separately pumped stream of 30% NaOH and the resulting slurry fluid stream was pumped into a wellhead in stages. Specific representative conditions for the proppant rate of an individual stage of a slurry fluid were provided in Table 1, and the field work curve was shown in FIG. 2.

TABLE 1

| | | Pumping rate m³/min | | | Amount added per stage | | | | 20% TCT conc. at Wellhead % | 30% NaOH conc. at Wellhead % | Proppant conc. at Wellhead % |
|---|---|---|---|---|---|---|---|---|---|---|---|
| Stage | Process* | Slurry | 20% TCT | 30% NaOH | Proppant m³ | Carrier m³ | 20% TCT m³ | 30% NaOH | | | |
| 1 | Preflush | 3.0 | 0 | 0 | 0 | 14.9 | 0 | 0 | 0 | 0 | 0 |
| 2 | Slurry | 3.0 | 0.025 | 0.011 | 0.80 | 11.4 | 0.095 | 0.042 | 0.83 | 0.37 | 7.0 |
| 3 | Slurry | 3.0 | 0.025 | 0.011 | 1.60 | 11.4 | 0.095 | 0.042 | 0.83 | 0.37 | 14.0 |
| 4 | Slurry | 3.0 | 0.025 | 0.011 | 3.00 | 10.7 | 0.089 | 0.040 | 0.83 | 0.37 | 28.0 |
| 5 | Slurry | 3.0 | 0.025 | 0.011 | 5.60 | 13.3 | 0.111 | 0.049 | 0.83 | 0.37 | 42.0 |
| 6 | Slurry | 3.0 | 0.025 | 0.011 | 1.43 | 2.9 | 0.024 | 0.011 | 0.83 | 0.37 | 49.3 |
| 7 | Displacement | 3.0 | 0 | 0 | 0 | 2.8 | 0 | 0 | 0 | 0 | 0 |

*preflush liquid was the solution of hydroxylpropyl guar gum; proppant used in stages 2-5 was quartz sand, and in stage 6 was resin coated quartz sand; displacement liquid was the same as preflush liquid.

As seen from Table 1, when the proppant slurry was pumped simultaneously with 30% NaOH, the proppant quality of the mixed stream in the wellbore was maintained at a level of from about 7% to about 50%. Thus, the sand-carrying performance of the slurry fluid was superior as compared to a traditional slurry fluid having a maximal sand-carrying level of approximate 25% in general.

Figure 2:
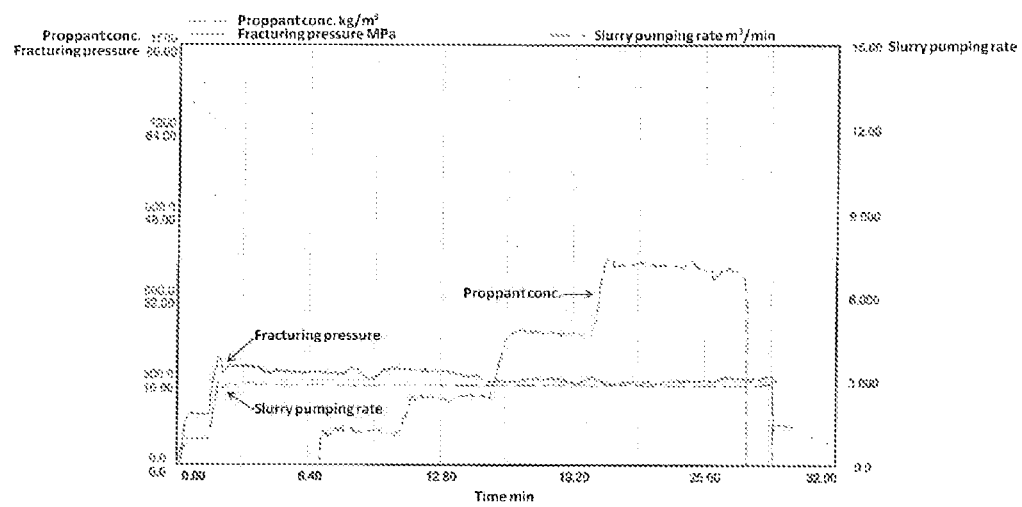
FIG. 2 shows the field work curve obtained in Example 10 of the present application.

As seen from the field work curve of FIG. 2, the fracturing pressure did not raise with the increase of the proppant content, especially, when the proppant content was more than 40%, the fracturing pressure did not significantly raise, indicating the excellent sand-carrying performance of the slurry.

The oil production and water content data of the experiment field were as follows: before fracturing, oil output was 3.92 tons per day, water output was 39.82 tons per day, and the water content was 91.04%; after fracturing, oil output was 5.26 tons per day, water output was 40.53 tons per day, and the water content was 88.51%. It can be seen that after fracturing, the oil output was significantly increased, with the water content being lower.

The above are only preferred examples of the invention, not to limit the scope of the invention. Any alternative, replacement or modification within the spirit and principle of the invention should be all included in the protecting scope of the invention.

The invention claimed is:

1. A crosslinked polymer comprising a crosslinked skeletal structure represented by the following formula (I):

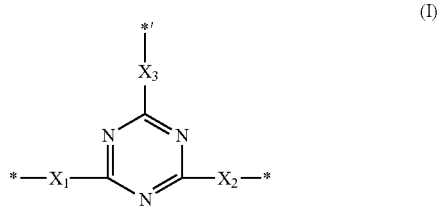

(I)

wherein * denotes a combining site with a polymer starting material, and *' denotes an optional combining site with the polymer starting material; wherein the combining sites denoted by * and *' may be located in the same polymer molecule, or in different polymer molecules, but there are at least two combining sites located in different polymer molecules; $X_1$ and $X_2$, which may be the same or different, are independently an oxy (—O—) or imino (—NH—) group; $X_3$ is an oxy (—O—) or imino (—NH—) group when *' denotes a combining site with the polymer starting material, or $X_3$ is a halogen, $NH_2$ or OH when *' isn't a combining site with the polymer starting material;

wherein the polymer starting material comprises at least one of galactomannan, galactomannan derivatives, konjac gum, konjac gum derivatives, chitin, chitin derivatives, chitosan, chitosan derivatives, xylan, xylan derivatives, glucan, glucan derivatives, xanthan gum, xanthan gum derivatives, sodium alginate, sodium alginate derivatives, polyvinyl alcohol, polyvinyl alcohol derivatives, polyacrylamide, and polyacrylamide derivatives; and wherein said crosslinked polymer is obtained through the reaction between hydroxyl and/or amino groups of the polymer starting material and 2,4,6-trihalogen-1,3,5-triazine.

2. The crosslinked polymer according to claim 1, wherein the galactomannan comprises at least one of the seed gum of guar, fenugreek, *sesbania, sesbania aculeata, robinia pseudoacacia, sophora japonica, indigofera pseudotinctoria, crotalaria mucronata, c. spectabilis, zenia insignis, gleditisia macracantha, gymnocladus chinensis, g. melanacantha, gleditisia heterophylla, g. japonica, gleditsia japonica* miq., *erythrophleum fordii, delonix regia, c. tora, c. nomame, cassia sophera, c. occidentalis, ceratonia siliqua, cassia javanica* 1. var. *indo-chinensis gagnep, cassia javanica* var. *indo-dainensis, cassia fistula, bauhinia veriegata* var. *candida, leicaena glauca, adenanthera pavonina, artemisia desertorum,* and *caesalpinia spinosa*.

3. A hydrogel formed from the crosslinked polymer of claim 1 in an aqueous medium, wherein at least one of boron, zirconium and titanium is optionally used as an additional crosslinking agent.

4. A method for preparing the crosslinked polymer of claim 1, comprising reacting 2,4,6-trihalogen-1,3,5-triazine with the polymer starting material, optionally in the presence of a pH regulator.

5. The method according to claim 4, wherein the ratio of 2,4,6-trihalogen-1,3,5-triazine to the polymer starting material is between 1000:1 and 1:1000 by weight, the molar ratio of 2,4,6-trihalogen-1,3,5-triazine to the pH regulator is between 1:0 and 1:100.

6. The method according to claim 4, wherein the polymer starting material is swelled in an aqueous medium before the reaction.

7. A water-based fracturing fluid for hydraulic fracturing, comprising:
(1) the hydrogel of claim 3; and
(2) at least one of surfactant, clay stabilizer, bactericide, gel breaker, pH regulator, filtrate reducer, drag reducer, diverter, foamer, temperature stabilizer, iron ion stabilizer, and mineral salt.

8. A method of hydraulic fracturing comprising: (1) preparing a water-based fracturing fluid containing the crosslinked polymer of claim 1, and (2) pumping said water-based fracturing fluid into a subterranean formation through a well hole.

9. A hydrogel formed from the crosslinked polymer of claim 2 in an aqueous medium, wherein at least one of boron, zirconium and titanium is optionally used as an additional crosslinking agent.

10. A method of hydraulic fracturing comprising: (1) preparing a water-based fracturing fluid containing the crosslinked polymer of claim 2, and (2) pumping said water-based fracturing fluid into a subterranean formation through a well hole.

11. A method of hydraulic fracturing comprising: (1) preparing a water-based fracturing fluid containing the hydrogel of claim 3, and (2) pumping said water-based fracturing fluid into a subterranean formation through a well hole.

12. A method of hydraulic fracturing comprising: (1) preparing a water-based fracturing fluid containing the hydrogel of claim 9, and (2) pumping said water-based fracturing fluid into a subterranean formation through a well hole.

13. The method according to claim 8, further comprising recycling the fracturing fluid after step (2) by (a) delivering the liquids after the fracturing of the water-based fracturing fluid back to the ground by pumping to form a flowback fluid, and (b) re-using the flowback fluid, alone or mixed with another water resource, as a polymer solvent.

14. The method according to claim 13, further comprising, between step (a) and step (b), a step of taking supernatant after the flowback fluid is treated with filtration or sedimentation.

15. The method according to claim 10, further comprising recycling the fracturing fluid after step (2) by (a) delivering the liquids after the fracturing of the water-based fracturing fluid back to the ground by pumping to form a flowback fluid, and (b) re-using the flowback fluid, alone or mixed with another water resource, as a polymer solvent.

16. The method according to claim 15, further comprising, between step (a) and step (b), a step of taking supernatant after the flowback fluid is treated with filtration or sedimentation.

17. The method according to claim 11, further comprising recycling the fracturing fluid after step (2) by (a) delivering the liquids after the fracturing of the water-based fracturing fluid back to the ground by pumping to form a flowback fluid, and (b) re-using the flowback fluid, alone or mixed with another water resource, as a polymer solvent.

18. The method according to claim 17, further comprising, between step (a) and step (b), a step of taking supernatant after the flowback fluid is treated with filtration or sedimentation.

19. The method according to claim 12, further comprising recycling the fracturing fluid after step (2) by (a) delivering the liquids after the fracturing of the water-based fracturing fluid back to the ground by pumping to form a flowback fluid, and (b) re-using the flowback fluid, alone or mixed with another water resource, as a polymer solvent.

20. The method according to claim 19, further comprising, between step (a) and step (b), a step of taking supernatant after the flowback fluid is treated with filtration or sedimentation.

\* \* \* \* \*